(12) United States Patent
Yamada (10) Patent No.: US 8,199,860 B2
(45) Date of Patent: Jun. 12, 2012

(54) DETECTION CIRCUIT AND DETECTION METHOD OF CARRIER OFFSET

(75) Inventor: Moto Yamada, Kyoto (JP)

(73) Assignee: Rohm Co., Ltd. (JP)

(*) Notice: Subject to any disclaimer, the term of this patent is extended or adjusted under 35 U.S.C. 154(b) by 924 days.

(21) Appl. No.: 12/194,109

(22) Filed: Aug. 19, 2008

(65) Prior Publication Data

US 2009/0092204 A1 Apr. 9, 2009

(30) Foreign Application Priority Data

Aug. 21, 2007 (JP) ................... 2007-214426

(51) Int. Cl.
*H04L 27/00* (2006.01)
(52) U.S. Cl. ........ 375/326; 375/324; 375/349; 375/334; 375/272; 329/300; 329/321; 329/323; 329/302; 329/303
(58) Field of Classification Search .......... 375/324, 375/334, 272, 349, 326; 329/300–310, 321, 329/323
See application file for complete search history.

(56) References Cited

U.S. PATENT DOCUMENTS

| | | | | |
|---|---|---|---|---|
| 5,414,736 A | * | 5/1995 | Hasegawa et al. | 375/334 |
| 5,440,265 A | * | 8/1995 | Cochran et al. | 329/300 |
| 6,529,566 B1 | * | 3/2003 | Carsello et al. | 375/340 |
| 7,035,352 B1 | * | 4/2006 | Malone et al. | 375/334 |
| 7,856,066 B2 | * | 12/2010 | Tanaka et al. | 375/260 |

FOREIGN PATENT DOCUMENTS

JP 10098500 4/1998

* cited by examiner

*Primary Examiner* — Eva Puente
*Assistant Examiner* — Rahel Guarino
(74) *Attorney, Agent, or Firm* — Cantor Colburn LLP (57) ABSTRACT

A carrier offset detection circuit is offered, which is provided to a demodulation circuit which demodulates a received signal subjected to FSK (Frequency Shift Keying) modulation, and which detects the offset of the carrier frequency between the transmitting side and the receiving side. A zero-crossing detection unit receives a digital base band signal indicating the level of the frequency shift (frequency deviation) of the received signal using the carrier frequency on the receiving side as a reference frequency, and detects a zero-crossing point of the base band signal and a base band signal obtained by delaying the former base band signal by one symbol, which occurs in a preamble period. A carrier offset detection circuit sets the offset value of the carrier frequency to the value of the base band signal at a timing of the zero-crossing point thus detected.

16 Claims, 7 Drawing Sheets

DETECTION CIRCUIT AND DETECTION METHOD OF CARRIER OFFSET

BACKGROUND OF THE INVENTION

1. Field of the Invention

The present invention relates to a demodulation technique for demodulating a received signal subjected to FSK (Frequency Shift Keying) modulation, and particularly to a carrier offset detection technique for detecting the offset of the carrier frequency between the receiving side and the transmitting side.

2. Description of the Related Art

In recent years, in order to perform transmission/reception of data among multiple electronic devices, various wireless communication systems according to various standards and methods have been proposed. For example, in the Bluetooth communication system, the carrier wave is subjected to FSK modulation using binary digital data composed of 1s and 0s as the modulation data. In such a wireless communication system, in a case in which difference in the carrier frequency (carrier offset) has occurred between the transmitter side and the receiver side, the carrier offset leads to a difficulty in precise demodulation. Accordingly, the receiver side includes a circuit which detects the carrier offset.

[Patent Document 1]
Japanese Patent Application Laid Open No. H10-98500

SUMMARY OF THE INVENTION

The present invention has been made in view of such a situation. Accordingly, it is a general purpose of the present invention to provide a technique which allows the carrier offset to be detected with high precision in a short period of time.

An embodiment of the present invention relates to a carrier offset detection circuit which is provided to a demodulation circuit which demodulates a received signal subjected to FSK (Frequency Shift Keying) modulation, and which detects offset in the carrier frequency between the transmitting side and the receiving side. The carrier offset detection circuit includes a zero-crossing detection unit and an offset detection. The zero-crossing detection unit receives a base band signal in the form of a digital signal which indicates the level of the frequency shift of the received signal using the carrier frequency on the receiving side as a reference frequency, and detects a zero-crossing point at which the base band signal and a base band signal obtained by delaying the former base band signal cross each other. The offset detection unit sets an offset value of the carrier frequency to the value of the base band signal at a timing of the zero-crossing point thus detected.

In the wireless communication system employing a preamble in which the value alternately switches between 1 and 0, the zero-crossing point occurs at an intermediate timing at which transition between "1" and "0" occurs, i.e., at a timing at which the frequency shift becomes 0. Accordingly, with the aforementioned embodiment, the value of the base band signal is acquired at a timing of the zero-crossing point at which the frequency shift becomes zero, thereby detecting the carrier offset in a short period of time for the preamble.

Another embodiment of the present invention also relates to a carrier offset detection circuit which is provided to a demodulation circuit which demodulates a received signal subjected to FSK (Frequency Shift Keying) modulation, and which detects offset in the carrier frequency between the transmitting side and the receiving side. The carrier offset detection circuit includes a preamble detection unit and an offset detection unit. The preamble detection unit receives a base band signal in the form of a digital signal which indicates the level of the frequency shift of the received signal using the carrier frequency on the receiving side as a reference frequency, and detects a preamble from the base band signal. The offset detection unit performs smoothing processing on the base band signal, and sets the offset value to the value of the base band signal which has been subjected to the smoothing processing over the preamble period.

In the wireless communication system employing a preamble in which the value alternately switches between 1 and 0, it is assumed that, in a case in which the carrier offset is zero, the average of the frequency shift over the preamble period is zero. In other words, in a case in which the average of the frequency shift over the preamble period does not match zero, the value thus calculated represents the carrier offset. Thus, with the above-described embodiment, the carrier offset can be detected in a short period of time for the preamble.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

In the present specification, the state represented by the phrase "the member A is connected to the member B" includes: a state in which the member A and the member B are physically and directly connected to each other; and a state in which the member A and the member B are indirectly connected to each other via another member that does not affect the electric connection therebetween. In the same way, the state represented by the phrase "the member C is provided between the member A and the member B" includes a state in which these members are indirectly connected to each other via another member that does not affect the electric connection therebetween, in addition to the state in which the member A and the member C, or the member B and the member C are directly connected.

Figure 1:
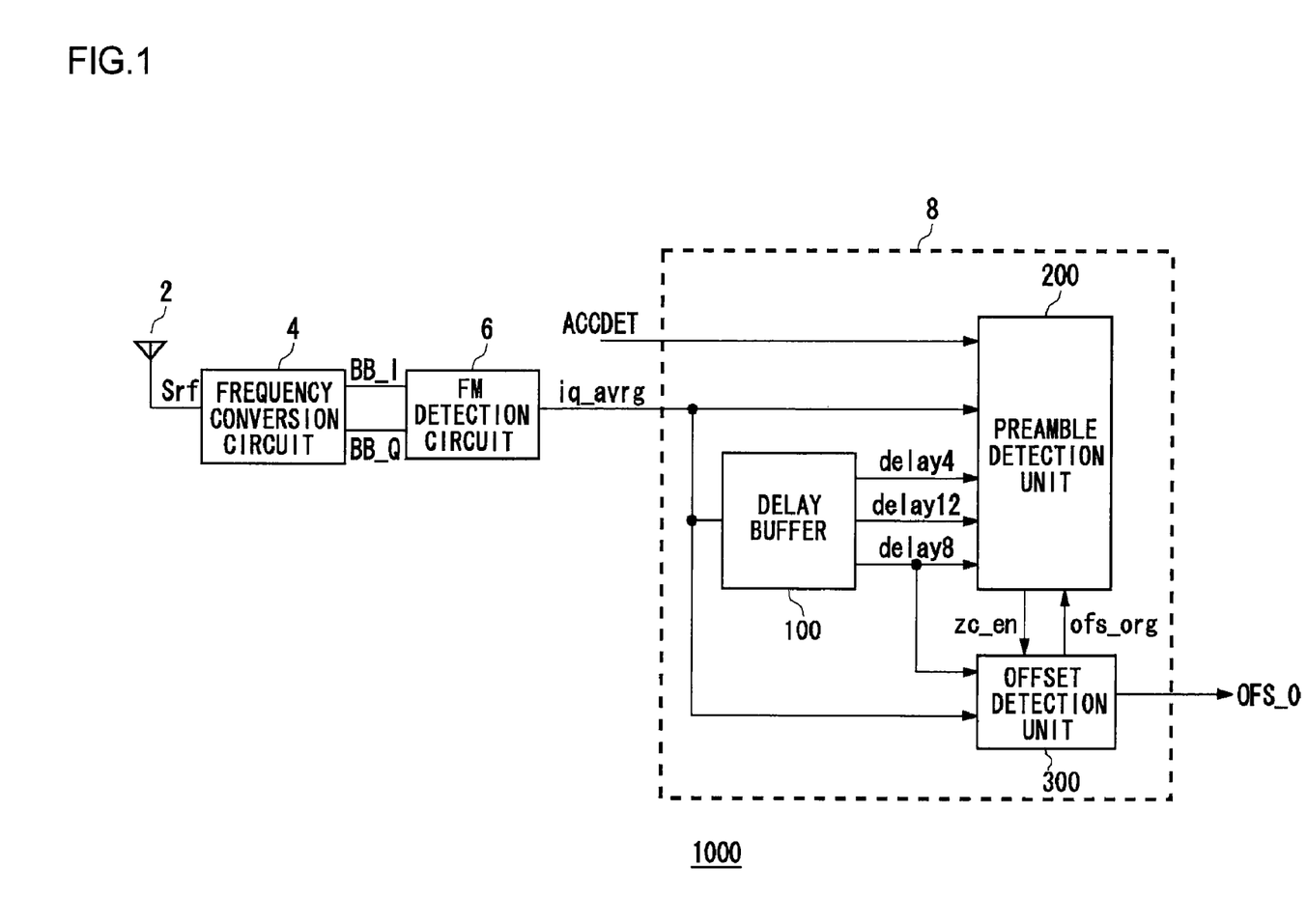
FIG. 1 is a block diagram which shows a configuration of a receiver of a wireless communication system according to an embodiment.

FIG. 1 is a block diagram which shows a configuration of a receiver 1000 of a wireless communication system according to an embodiment. A transmitter (not shown) and the receiver 1000 of the wireless communication system transmits/receives a carrier wave subjected to FSK (Frequency Shift Keying) modulation. Description will be made below assuming that the wireless communication system performs communication stipulated by the Bluetooth standard. However, the present invention is not restricted to such an arrangement. Also, the present invention can be applied to other standards. The receiver 1000 may be mounted on various kinds of information communication devices such as cellular phone terminals, personal computers, digital cameras, and home electronics.

The transmitter transmits a high-frequency signal (RF signal) Srf subjected to FSK modulation, which is obtained by modulating a carrier wave using a digital signal of binary data (composed of 1s and 0s) as the modulation signal. The receiver 1000 receives the RF signal Srf transmitted from the transmitter, and demodulates the digital signal from the RF signal. The receiver 1000 includes an antenna 2, a frequency conversion circuit 4, an FM detection circuit 6, and a carrier offset detection circuit (which will be referred to as "offset detection circuit" hereafter) 8.

Via the antenna 2, the RF signal (modulated wave) at a carrier frequency of 2.4 GHz subjected to the FSK modulation is received. In reality, the carrier frequency is constantly changing due to frequency hopping. The frequency conversion circuit 4, the FM detection circuit 6, and the offset detection circuit 8 forms a demodulation circuit which performs demodulation of the RF signal Srf. The RF signal Srf is input to the frequency conversion circuit 4. The frequency conversion circuit 4 performs frequency conversion (down conversion) on the RF signal at 2.4 GHz so as to divide the RF signal into the in-phase component BB_I and the quadrature component BB_Q. The FM detection circuit 6 generates, based upon the in-phase component BB_I and the quadrature component BB_Q, a digital base band signal iq_avrg which indicates the level of the frequency deviation of the RF signal Srf. In the Bluetooth system, the symbol rate is 1 MHz, and the base band signal iq_avrg generated by the FM detection circuit 6 is sampled at 8 MHz. Furthermore, in the present embodiment, let us say that the bit number of the base band signal iq_averg is 9 bit. Moreover, the level of the frequency shift indicated by the base band signal iq_averg is quantized in increments of 1.95 kHz.

In the wireless communication system, the carrier frequency on the transmitter side and the carrier frequency used in demodulation performed by the receiver 1000 does not exhibit perfect matching. Accordingly, the offset detection circuit 8 detects the offset (carrier offset) of the carrier frequency between the receiving side and the transmitting side, and outputs an offset signal OFS_O which indicates the amount of the carrier offset. The receiver 1000 performs demodulation processing with reference to the offset amount detected by the offset detection circuit 8.

The offset detection circuit 8 includes a delay buffer 100, a preamble detection unit 200, and an offset detection unit 300. The offset detection circuit 8 receives the base band signal iq_avrg and an access code detection signal ACCDET as input signals. The access code detection signal ACCDET is a signal which indicates the access code in the first 72 bits of the packet. The access code detection signal ACCDET is generated by an unshown circuit, and is input along with the base band signal iq_avrg. The access code detection signal ACCDET is set to the low-level state during a period for the 72-bit data from the head in the base band signal iq_avrg, following which the access code detection signal ACCDET is set to the high-level state.

As described above, the base band signal iq_avrg is a signal sampled at 8 MHz which is eight times of the symbol rate of 1 MHz. The delay buffer 100 generates a delayed signal delay4 which is delayed by four sampling periods, i.e., by a period of ½ symbols worth, a delayed signal delay8 which is delayed by eight sampling periods, i.e., by a period of a single symbol worth, and a delayed signal delay12 which is delayed by twelve sampling periods, i.e., by a period of 3/2 symbols worth. The delay buffer 100 may be configured of a sift register including multiple latch circuits (delay circuits) connected in a cascaded manner. Also, the delay buffer 100 may have other configurations.

In the digital wireless communication, a preamble including a predetermined bit pattern is located in the first few bits from the head in a packet data. In the Bluetooth system, the four-bit area from the head in the packet is set aside for the preamble, and stores pattern data of "1010" or "0101". The preamble detection unit 200 is a circuit which detects the preamble.

The preamble is located at the head of the packet data. Accordingly, the preamble is demodulated without being subjected to the correction of the carrier offset. Accordingly, it is difficult to detect the preamble based upon the demodulated data. In order to solve this problem, the preamble detection unit 200 according to the present embodiment makes comparison between the base band signal iq_avrg which is used as a base signal and the signal shifted relatively from the base band signal iq_avrg by a period of a single symbol worth, i.e., the delayed signal delay8, and detects the intersection (zero-crossing point) of these two signals. In a case in which there is a pattern of "1010" or "0101", the zero-crossing point is detected according to a predetermined rule. The preamble detection unit 200 outputs a zero-crossing signal zc_en, which is switched to a predetermined level (high level) at a zero-crossing timing. Detailed description will be made later regarding the preamble detection unit 200.

The offset detection unit 300 latches the base band signal iq_avrg at the timing of the zero-crossing signal zc_en. In the ideal state in which the carrier offset between the transmitting side and the receiving side is zero, it is assumed that the frequency shift with respect to the pattern data "1010" becomes zero at an intermediate timing at which the data transits between 1 and 0, i.e., at every zero-crossing point. In other words, in a state in which a carrier offset has occurred, the value of the frequency deviation at the timing of the zero-crossing point at which the data transits between 1 and 0, i.e., the value of the base band signal iq_avrg at the timing of the zero-crossing point at which the data transits between 1 and 0 represents the amount of the carrier offset. Accordingly, the offset detection unit 300 outputs the value of the base band signal iq_avrg latched at the timing of the zero-crossing point, as the offset value OFF_O of the carrier frequency.

Also, from another perspective, the offset detection unit 300 performs the following processing. In the ideal state in which the carrier offset is zero, it is assumed that the time average of the frequency shift (base band signal iq_avrg) over the preamble period in which the "1010" pattern or "0101" pattern is repeated is zero. In other words, in a state in which a carrier offset has occurred, the average of the frequency deviation represents the carrier offset amount. Accordingly, the offset detection unit 300 performs smoothing processing on the base band signal iq_avrg, and outputs the base band signal iq_avrg thus smoothed as the carrier offset value OFS_O.

The above is the overall configuration of the receiver 1000. Detailed description will be made below in order regarding the configurations of the preamble detection unit 200 and the offset detection unit 300.

Figure 2:
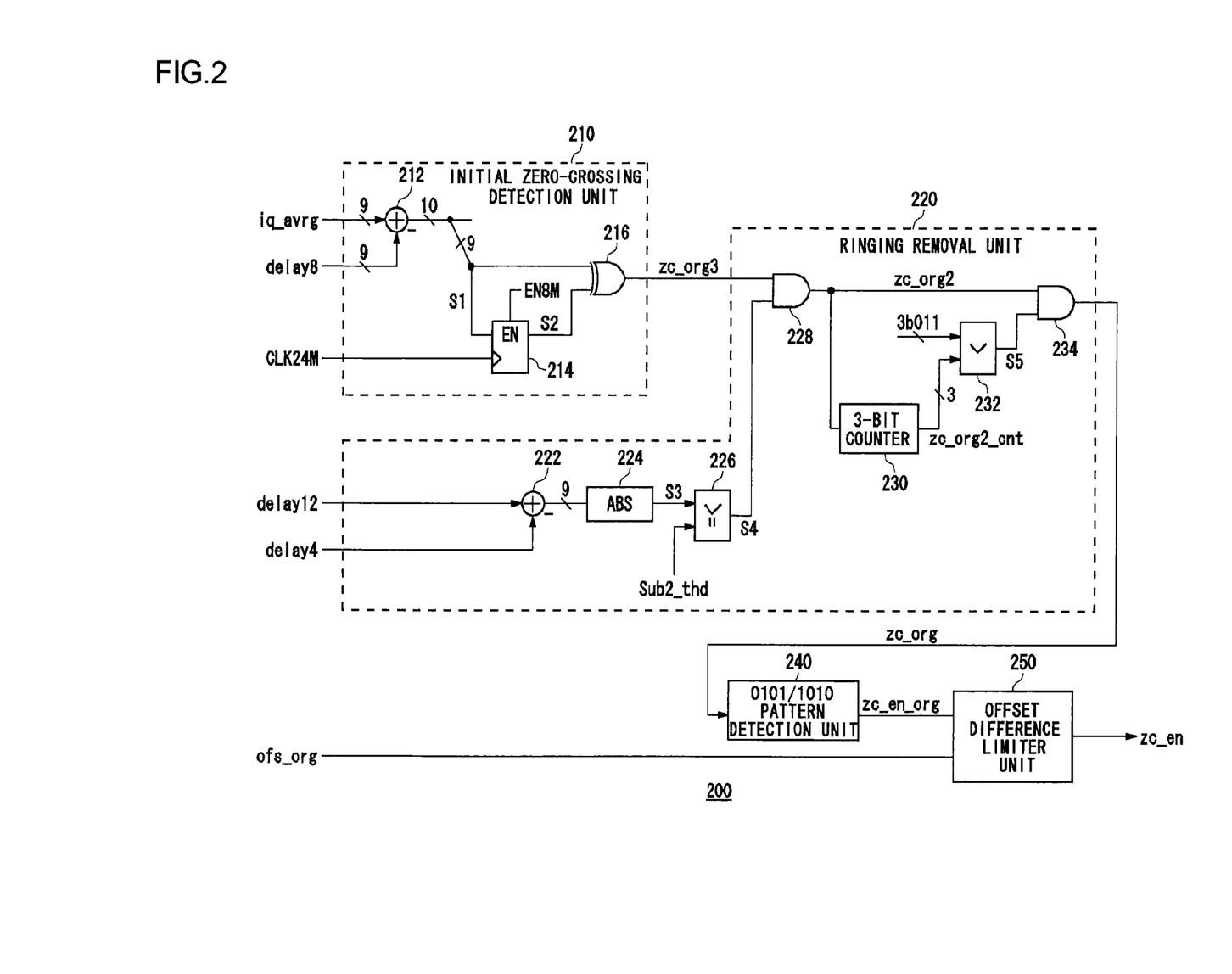
FIG. 2 is a block diagram which shows a configuration of the a preamble detection unit shown in FIG. 1.
Figure 3:
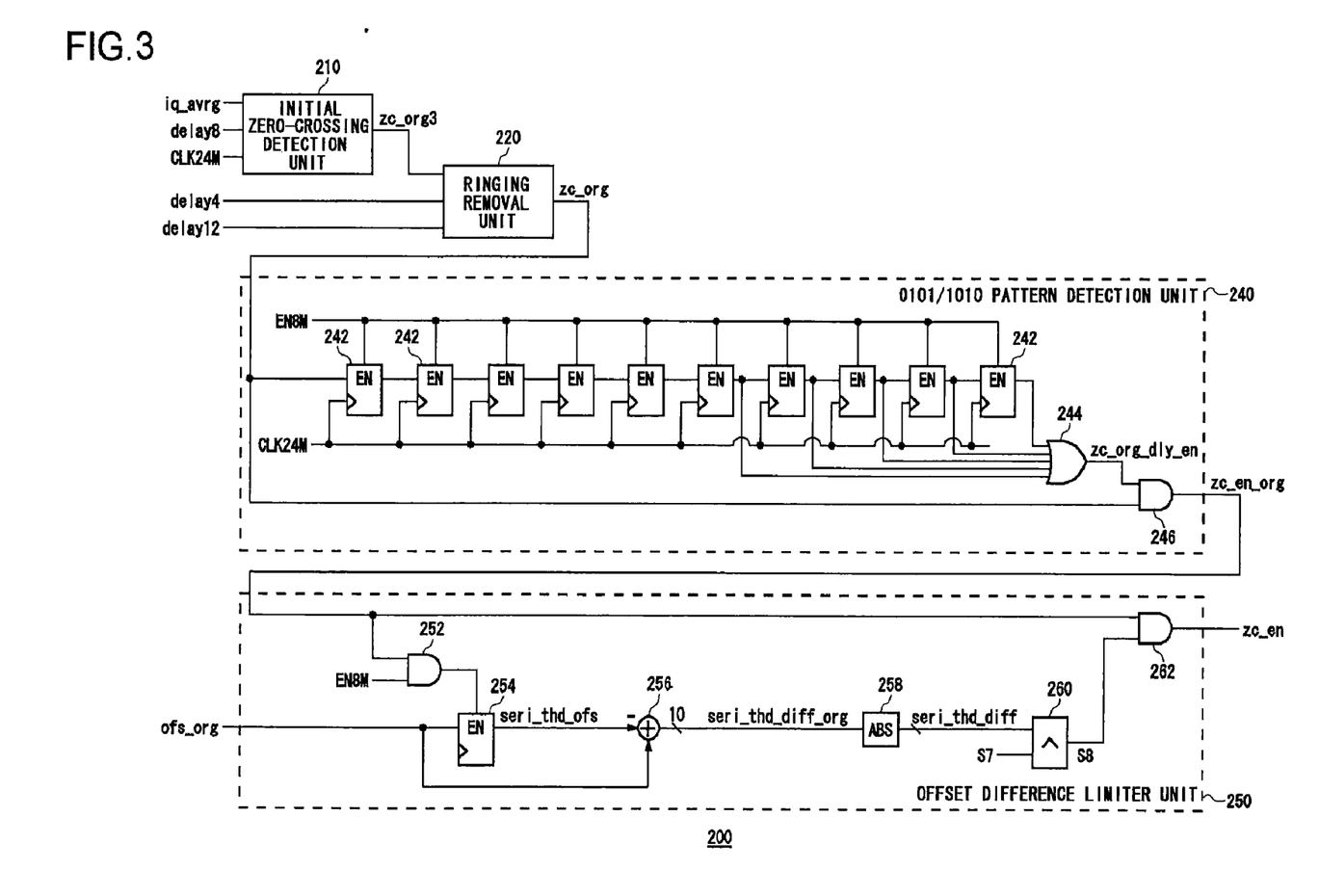
FIG. 3 is a block diagram which shows a configuration of the preamble detection unit shown in FIG. 1.

FIG. 2 and FIG. 3 are block diagrams which show the configuration of the preamble detection unit 200. The preamble detection unit 200 includes an initial zero-crossing detection unit 210, a ringing removal unit 220, a pattern detection unit 240, and an offset difference limiter unit 250. FIG. 2 shows detailed configurations of the initial zero-crossing detection unit 210 and the ringing removal unit 220. FIG. 3 shows detailed configurations of the pattern detection unit 240 and the offset difference limiter unit 250. FIGS. 5A and 5B and FIGS. 6A and 6B are operation waveform diagrams for the preamble detection unit 200.

Figure 5A:
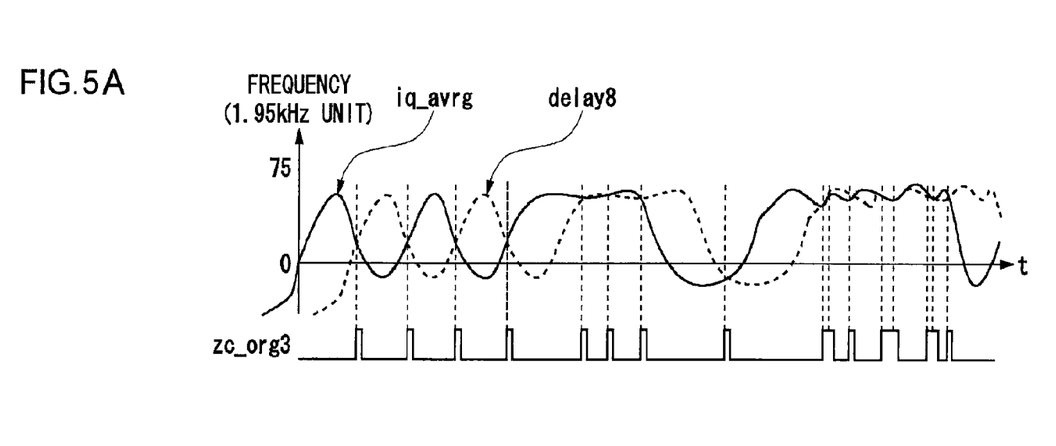
FIGS. 5A and 5B are operation waveform diagrams for the preamble detection unit shown in FIG. 1.

The initial zero-crossing detection unit 210 detects the timing at which the difference between the base band signal iq_avrg and the delayed signal delay8 becomes zero, as the zero-crossing point. The initial zero-crossing detection unit 210 generates a zero-crossing signal zc_org3 which switches to the high-level state at a timing of the zero-crossing point. FIG. 5A is an operation waveform diagram for the initial zero-crossing detection unit 210.

The initial zero-crossing detection unit 210 shown in FIG. 2 includes an adder 212, a latch circuit 214, and an XOR gate 216. The adder 212 subtracts the delayed signal delay8 from the base band signal iq_avrg. Using the enable signal EN8M, the latch circuit 214 latches the sign bit (highest-order bit) S1[9] of the 10-bit difference signal S1[9:0] output from the adder 212. The enable signal EN8M is a clock signal at a frequency of 8 MHz that matches the sampling frequency of the base band signal iq_avrg. On the other hand, the clock signal CLK24M is a clock signal at a frequency of 24 MHz. The XOR gate 216 creates the exclusive-OR (XOR) of the sign bit S1[9] of the difference signal S1 obtained from the adder 212 and the sign bit S1[9] of the difference signal S1 latched by the latch circuit 214. The output of the XOR gate 216 is the zero-crossing signal zc_org3.

Figure 5B:
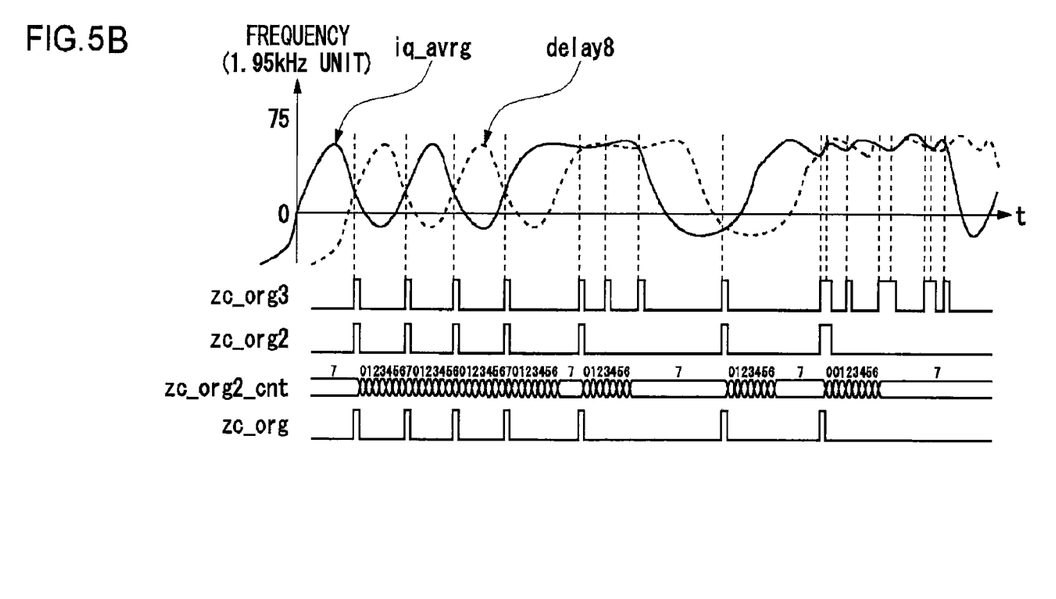

The zero-crossing signal zc_org3 detected by the initial zero-crossing detection unit 210 includes unnecessary zero-crossing points which have occurred unrelated to the preamble of "1010" (or "0101"). The ringing removal unit 220 removes pseudo zero-crossing points due to the ringing of the waveform, which are a part of the unnecessary zero-crossing points. FIG. 5B is an operation waveform diagram for the ringing removal unit 220.

During the preamble period, each zero-crossing point occurs when the amplitude changes according to the pattern "1010" (or "0101"). Accordingly, it is assumed that the difference between the value of the base band signal iq_avrg at a certain timing near the zero-crossing point and the value thereof a short period before (or after) the former timing would exhibit a relatively large value. On the other hand, at each pseudo zero-crossing point which is erroneously detected due to the ringing in the waveform, there is a tendency for the difference in the value of the base band signal iq_avrg between a timing near the zero-crossing point and another timing a short period before the former timing to exhibit a small value. Accordingly, in a case in which the difference between the value of the base band signal iq_avrg at a timing near the zero-crossing point and the value of the base band signal iq_avrg at another timing a predetermined period before the former timing is smaller than a predetermined threshold value, the ringing removal unit 220 removes this zero-crossing point. This processing allows the pseudo zero-crossing points to be removed. The zero-crossing signal, from which the pseudo zero-crossing points have been removed, will be referred to as "zero-crossing signal zc_org2".

In a case in which the difference between the value of the base band signal iq_avrg (delayed signal delay4) at a timing ½ symbols (4 sampling periods) before a zero-crossing point and the value of the base band signal iq_avrg (delayed signal delay12) at a timing 3/2 symbols (12 sampling periods) before the zero-crossing point is smaller than a threshold value sub_thd, the ringing removal unit 220 removes this zero-crossing point.

The ringing removal unit 220 shown in FIG. 2 includes an adder 222, an absolute value circuit 224, a comparator 226, an AND gate 228, a 3-bit counter 230, a comparator 232, and an AND gate 234. The adder 222 subtracts the delayed signal delay4 from the delayed signal delay12. The absolute value circuit 224 creates the absolute value S3 of the subtraction result. The comparator 226 compares the absolute value S3 with the threshold value sub_thd. The output S4 of the comparator 226 is used as a mask signal.

The AND gate 228 makes the logical AND of the initial zero-crossing detection signal zc_org3 and the mask signal S4, thereby masking the initial zero-crossing detection signal zc_org3 using the mask signal S4. The output zc_org2 of the AND gate 228 is a zero-crossing detection signal in which the zero-crossing points due to the ringing of the waveform have been removed. In order to remove remaining unnecessary zero-crossing points which cannot be removed using the mask signal S4, the ringing removal unit 220 further performs the following processing.

During the preamble period, the zero-crossing point occurs at a cycle of the symbol rate, i.e., a cycle of 1 MHz. Accordingly, in a case in which the time interval between the adjacent zero-crossing points is smaller than a predetermined threshold value, the AND gate 228 removes the latter zero-crossing point. In the circuit shown in FIG. 2, in a case in which the time interval between the adjacent zero-crossing points is smaller than 0.5 μs (½ symbols=4 sampling periods), the AND gate 228 performs zero-crossing point removing processing.

The 3-bit counter 230 starts counting processing based upon the enable signal EN8M every time the zero-crossing signal zc_org2 is switched to the high-level state, i.e., every zero-crossing timing. The comparator 232 compares the count value zc_org2_cnt counted by the 3-bit counter 230 with a predetermined threshold value. In FIG. 2, the threshold value is 3 (3b011). The AND gate 234 removes the pseudo zero-crossing points from the zero-crossing signal zc_org2 using the output S5 of the comparator 232 as a mask signal. The output of the AND gate 234 is output as the zero-crossing signal zc_org to the pattern detection unit 240 which is a downstream component.

Description will be made with reference to FIG. 3. The 0101/1010 pattern detection unit (which will be referred to as "pattern detection unit" hereafter) 240 detects the pattern "0101" (or "1010") of the preamble with reference to the zero-crossing signal zc_org. During a period other than the preamble period, the zero-crossing point occurs when the data transits from 0 to 1 or 1 to 0 occurs. Accordingly, the pattern detection unit 240 is provided in order to extract the pattern "1010" (or "0101") included in the preamble.

Focusing on the pattern "0101" (or "1010"), zero-crossing point occurs every symbol. In other words, determination can be made that the zero-crossing points which have not occurred every symbol do not correspond to the preamble.

That is to say, determination can be made that such zero-crossing points have occurred in a data period other than the preamble period.

With regard to each of the pulses in the zero-crossing signal zc_org, in a case in which there is no zero-crossing pulse approximately one symbol before a given pulse in the zero-crossing signal zc_org, the pattern detection unit 240 shown in FIG. 3 removes this pulse by masking processing. Focusing on a given pulse, in a case in which there is no pulse in a range with the point in time one symbol (8 sampling periods) before the pulse as the midpoint between the point in time two sampling periods before the midpoint and the point in time two sampling periods after the midpoint (i.e., a range between the point in time 10 sampling periods before the pulse of interest and the point in time 6 sampling periods before the pulse of interest), the pattern detection unit 240 removes this pulse.

The pattern detection unit 240 includes: multiple, i.e., ten latch circuits 242 which operate as a delay circuit; an OR gate 244; and an AND gate 246. Each of the latch circuits 242 delays the data input from the previous-stage component by one sampling period. The sixth-stage through tenth-stage latch circuits 242 output signals obtained by delaying the zero-crossing signal zc_org by 6 sampling periods through 10 sampling periods, respectively.

Figure 6A:
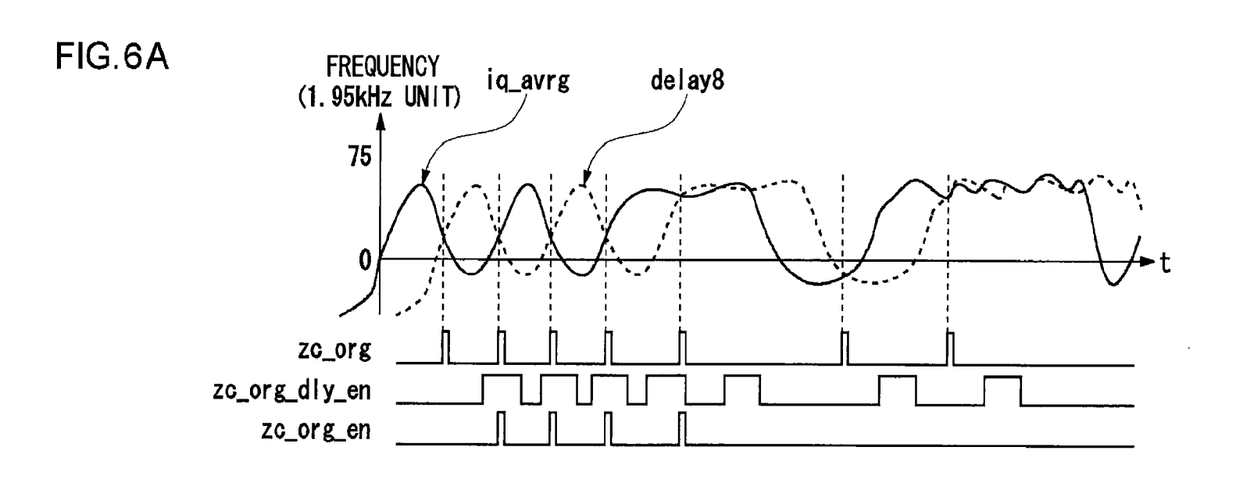
FIGS. 6A and 6B are operation waveform diagrams for the preamble detection unit shown in FIG. 1.

The OR gate 244 creates the logical OR of the output signals of the sixth-stage through tenth-stage latch circuits 242. The AND gate 246 receives the zero-crossing signal zc_org which has not been subjected to delay processing and the output zc_org_dly_en of the OR gate 244. In a case in which there is a high-level state in any one of the signals delayed by delay periods ranging between six sampling periods and ten sampling periods from the zero-crossing signal zc_org which is input to the AND gate 246 at the same time, the OR gate 244 outputs an output signal zc_org_dly_en at the high level. Accordingly, in a case in which there is not high-level state in any one of the signals delayed from the zero-crossing signal zc_org by delay periods ranging between six sampling periods and ten sampling periods, the AND gate 246 masks the zero-crossing signal zc_org. FIG. 6A is an operation waveform diagram for the pattern detection unit 240.

The offset difference limiter unit 250 further masks the false-detection pulses in the zero-crossing signal zc_en_org. Specifically, the offset difference limiter unit 250 performs sampling processing on the offset signal ofs_org generated by the offset detection unit 300 shown in FIG. 1 every time pulse (i.e., every zero-crossing point) occurs in the zero-crossing signal zc_en_org. In a case in which the difference in the sampled value between the preceding adjacent zero-crossing points is greater than a predetermined threshold value, the offset difference limiter unit 250 masks this pulse. The offset signal ofs_org is a signal obtained by smoothing the base band signal iq_avrg.

The offset difference limiter unit 250 includes an AND gate 252, a latch circuit 254, an adder 256, an absolute value circuit 258, a comparator 260, and an AND gate 262.

The AND gate 252 outputs the logical AND of the enable signal EN8M and the zero-crossing signal zc_en_org. The latch circuit 254 performs sampling processing on the offset signal ofs_org using the output of the AND gate 252. The latch circuit 254 delays the offset signal ofs_org by the pulse interval of the zero-crossing signal zc_en_org.

The adder 256 subtracts the delayed signal seri_thd_ofs from the offset signal ofs_org, thereby generating the difference seri_thd_diff_org. The absolute value circuit 258 creates the absolute value seri_thd_diff of the difference seri_thd_diff_org. The comparator 260 compares the absolute difference value seri_thd_diff with a predetermined threshold value S7. For example, the threshold value is set to 24 (which corresponds to 46.8 kHz). In a case in which the absolute difference value seri_thd_diff is smaller than the threshold value S7, the comparator 260 outputs the output signal S8 at the high level. The AND gate 262 performs masking processing on the zero-crossing signal zc_en_org using the output S8 of the comparator 260.

Figure 6B:
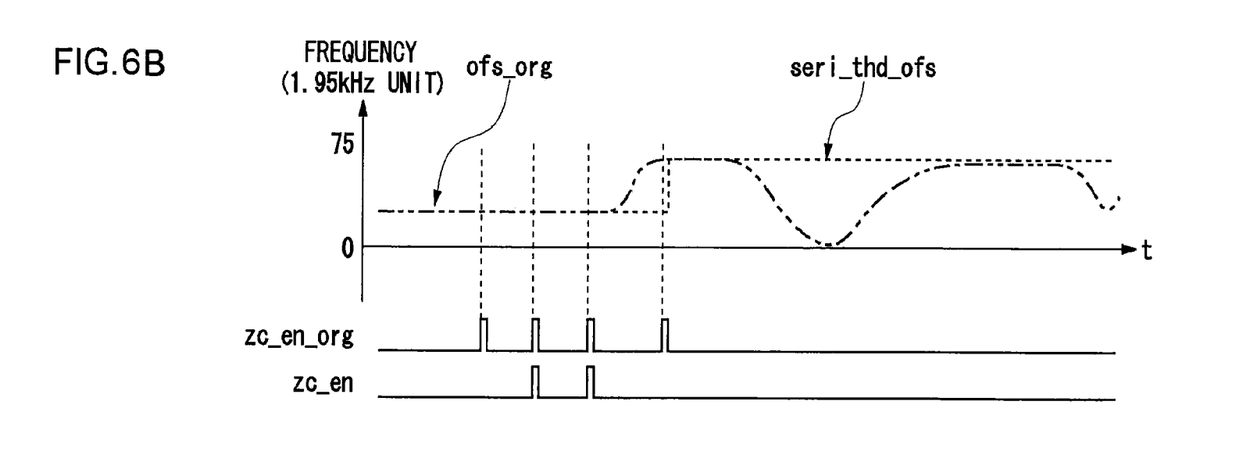

The offset difference limiter unit 250 removes the zero-crossing points due to rapid change in the carrier offset. The output zc_en of the offset difference limiter unit 250 is output to a downstream component, i.e., the offset detection unit 300. FIG. 6B is an operation waveform diagram for the offset difference limiter unit 250.

Figure 4:
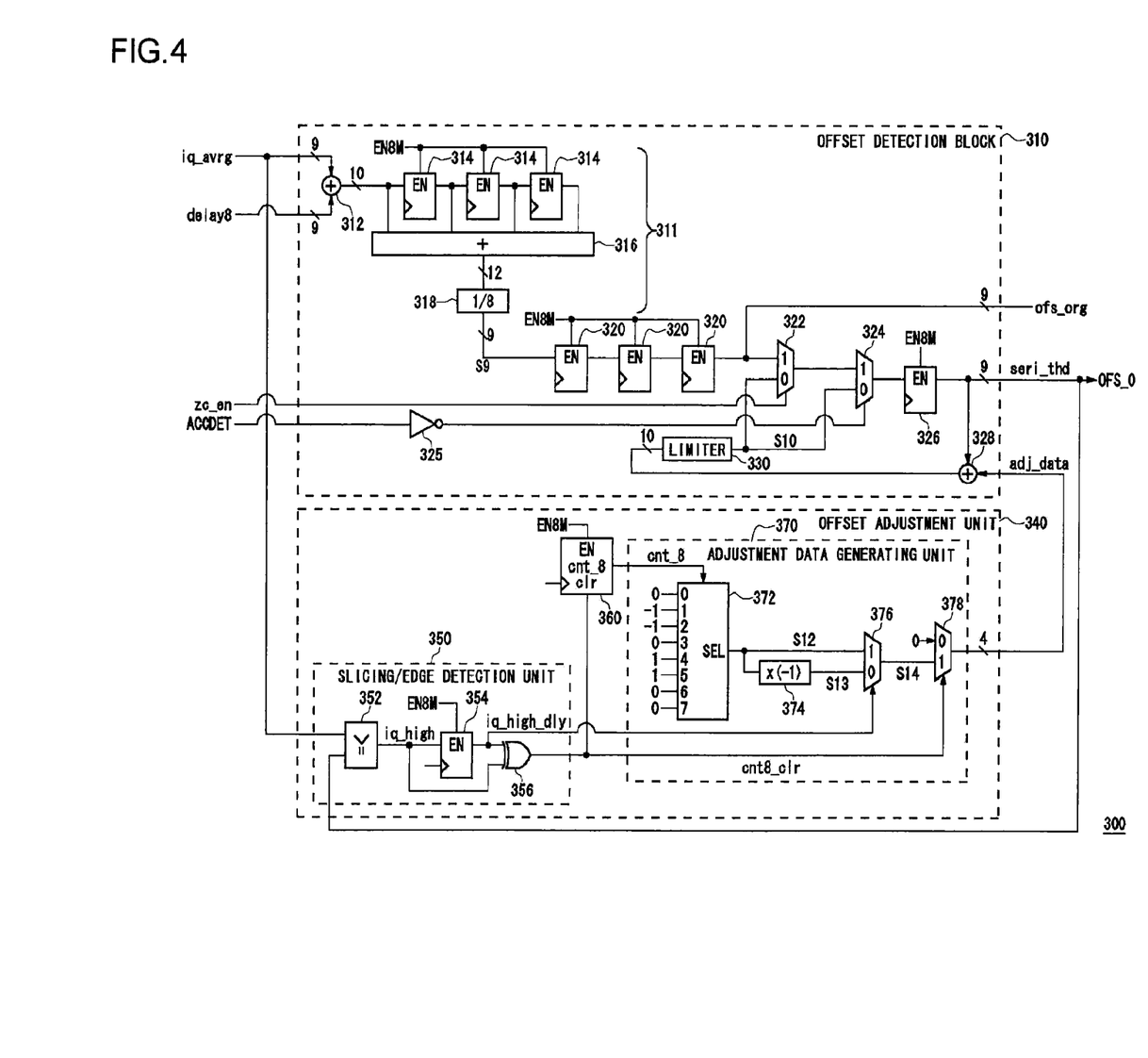
FIG. 4 is a block diagram which shows a configuration of an offset detection unit shown in FIG. 1.

FIG. 4 is a block diagram which shows a configuration of the offset detection unit 300. The offset detection unit 300 performs sampling processing on the data that corresponds to the base band signal iq_avrg using the zero-crossing signal zc_en, and detects the carrier offset. Thus, such an arrangement suitably detects the carrier offset during the preamble period.

The offset detection unit 300 includes an offset detection block 310 and an offset adjustment unit 340.

The offset detection block 310 includes a smoothing circuit 311, a latch circuit 320, a selector 322, a selector 324, a latch circuit 326, and an adder 328. The smoothing circuit 311 performs smoothing processing on the base band signal iq_avrg. The smoothing circuit 311 includes an adder 312, an adder 316, and an divider 318.

The adder 312 creates the sum of the base band signal iq_avrg and the delayed signal delay8 (which is essentially the average, giving consideration to the divider 318 which is a downstream component). Each of three latch circuits 314 delays its input by one symbol. The adder 316 creates the sum of the outputs of the adder 312 and the three latch circuits 314. The divider 318 divides the sum output from the adder 316 by 8. The smoothing circuit 311 calculates the moving average S9 of the base band signal iq_avrg in increments of symbol periods thereof, thereby smoothing the base band signal iq_avrg.

The three latch circuits 320 delay the output of the divider 318 by three symbols. The moving average S9 thus delayed is output as the offset signal ofs_org to the offset difference limiter unit 250 of the preamble detection unit 200 described above.

The selector 322 receives the offset signal ofs_org via the input 1, and receives the output signal of a limiter 330 via the input 0. The selector 322 selects the offset signal ofs_org at a timing at which the zero-crossing signal zc_en generated by the preamble detection unit 200 is switched to the high-level state.

The selector 324 receives the output signal of the selector 322 via the input 1, and receives the output signal of the limiter 330 via the input 0. An inverter 325 inverts the access code detection signal ACCDET. The selector 324 selects the output of the selector 322 at a timing at which the inverted access code detection signal ACCDET is switched to the high-level state.

As described above, during the period for the access code which occupies the first 72 bits in the packet, the access code detection signal ACCDEC is in the low-level state, following which the access code detection signal ACCDEC is switched to the high-level state. Accordingly, during a period in which the zero-crossing detection signal zc_en is in the high-level state, and the access code detection signal ACCDET is in the low-level state, the selectors 322 and 324 select the offset signal ofs_org. Otherwise, the selector 324 outputs the output S10 of the limiter 330. By providing the selector 324, such an arrangement prevents the carrier offset from being detected based upon the zero-crossing point erroneously detected in the code other than the access code.

The latch circuit 326 latches the output of the selector 324 in order to synchronize the timing operation. The output of the latch circuit 326 is output as the OSF_O which indicates the amount of the carrier offset.

After the period for the access code, the offset detection unit 300 performs fine adjustment of the value of the carrier offset based upon the value of the subsequent base band signal iq_avrg. The offset adjustment unit 340 generates a correction value adj_data used for the fine adjustment. The adder 328 of the offset detection block 310 adds the correction value adj_data to the offset signal OFS_O. The limiter 330 limits the range of the output of the adder 328. Specifically, the output of the limiter 330 is limited to a range between −256 and +256 (between −500 kHz and +500 kHz). In the Bluetooth system, the bandwidth of one channel is 1 MHz. By providing the limiter 330, such an arrangement prevents the carrier offset from being adjusted beyond the bandwidth.

Figure 7:
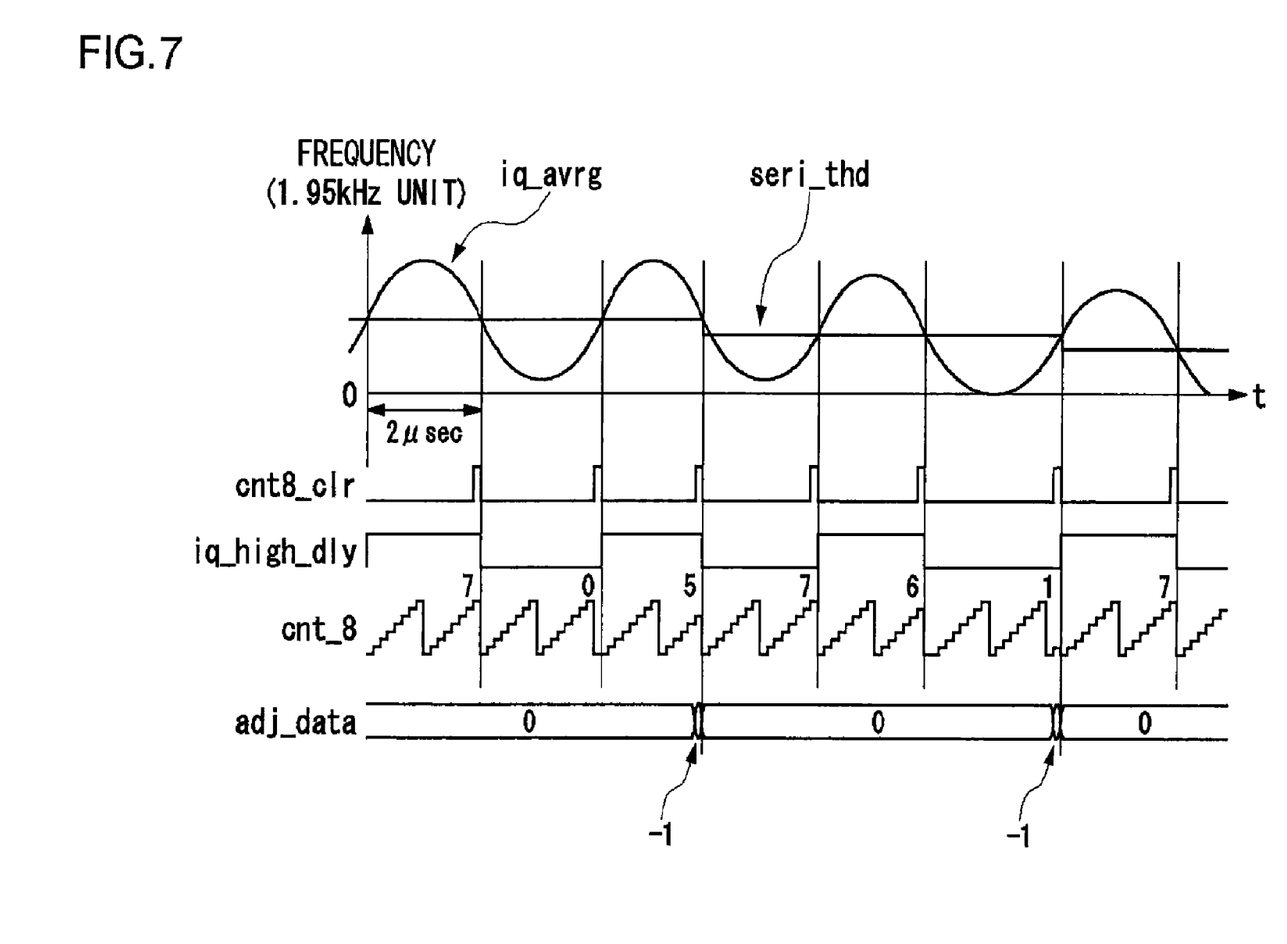
FIG. 7 is an operation waveform diagram for an offset adjustment unit shown in FIG. 4.

The offset adjustment unit 340 includes a slicing/edge detection unit 350, a counter 360, and an adjustment data generating unit 370. FIG. 7 is an operation waveform diagram for the offset adjustment unit 340.

The slicing/edge detection unit 350 slices the base band signal iq_avrg using the offset signal OFS_O, and generates a count clear signal cnt8_clr which is switched to the high-level state every time these two signals cross each other. The slicing/edge detection unit 350 measures the cycle period (pulse interval) of the count clear signal cnt8_clr, and generates the correction value adj_data according to the cycle period.

The slicing/edge detection unit 350 includes a comparator 352, a latch circuit 354, and an XOR gate 356. The comparator 352 generates a signal iq_high which is in the high-level state when the base band signal iq_avrg is greater than the offset signal OFS_O. The latch circuit 354 delays the signal iq_high by one sampling period. The XOR gate 356 outputs the exclusive-OR of the signals iq_high and iq_high_dly. The output (count clear signal) cnt8_clr of the XOR gate 356 is switched to the high-level state every time the level transition of the signal iq_high occurs.

The counter 360 is an octal counter. The counter 360 is reset every time the count clear signal cnt8_clr is switched to the high-level state, and is incremented according to the enable signal EN8M. The count value cnt_8 counted by the counter 360 is input to a selector 372.

The enable signal EN8M has a sampling frequency eight times of the symbol rate of 1 MHz. Accordingly, in a case in which the counter value cnt_8 is near 7, there is no need to correct the carrier offset. The adjustment data generating unit 370 generates the correction value adj_data according to the count value cnt_8.

The adjustment data generating unit 370 includes the selector 372, a sign inverter 374, a selector 376, and a selector 378.

The selector 372 includes eight inputs, and selects any one of these inputs according to the count value cnt_8. The number of the inputs of the selector 372 should be determined according to the base of the number system of the counter 360. As an example, in a case in which the counter value cnt_8 matches 0, 3, 6, or 7, the correction value is set to 0. In a case in which the counter value cnt_8 matches 1 or 2, the correction value is set to −1 (−1.95 kHz). In a case in which the count value cnt_8 is 4 or 5, the correction value is set to 1 (+1.95 kHz). It should be noted that the settings of the correction value has been described for exemplary purposes only. Also, the correction value may be adjusted as desired.

The sign inverter 374 and the selector 372 invert the value of the correction value S12 according to the value of the signal iq_high_dly. Specifically, the sign inverter 374 inverts the sign of the output of the selector 372. The selector 376 receives the output S12 of the selector 372 via the input 1, and receives the output S13 of the sign inverter 374 via the input 0. When the signal iq_high_dly is in the high-level state, the selector 376 selects the signal S12. Otherwise, the selector 376 selects the signal S13 which is the inverted sign signal.

The selector 378 receives the signal S14 via the input 1, and receives the value "0" via the input 0. The selector 378 outputs the signal S14 as the correction value adj_data every time the offset signal OFS_O and the base band signal iq_avrg cross each other, i.e., every time the count clear signal cnt8_clr is switched to the high-level state. Otherwise, the correction value adj_data is set to 0. By providing the offset adjustment unit 340, such an arrangement suitably adjusts the carrier offset according to the change in the carrier offset even if the carrier offset changes at an intermediate point in time during the packet.

The receiver 1000 according to the present embodiment detects the carrier offset OFS_O in a short period of time for a preamble, and performs demodulation processing with reference to the carrier offset thus detected.

The settings of the logical values of the signals, such as the high-level state and the low-level state of the signals, have been described in the present embodiment for exemplary purposes only. The settings can be freely modified by inverting the signals using inverters or the like.

While the preferred embodiments of the present invention have been described using specific terms, such description is for illustrative purposes only, and it is to be understood that changes and variations may be made without departing from the spirit or scope of the appended claims.

What is claimed is:

1. A carrier offset detection circuit which is provided to a demodulation circuit which demodulates a received signal subjected to FSK (Frequency Shift Keying) modulation, and which detects a carrier offset frequency between a transmitting side and a receiving side, comprising:

a zero-crossing detection unit which receives a base band signal in the form of a digital signal which indicates a level of the frequency deviation of the received signal from the carrier frequency on the receiving side, and detects a zero-crossing point at which the base band signal and a base band signal obtained by delaying the base band signal by one symbol cross each other; and an offset detection unit which determines a value of the base band signal at a timing of the zero-crossing point detected by the zero-crossing detection unit as the carrier offset frequency, wherein the offset detection unit performs smoothing processing on the base band signal, and determines a value of the base band signal smoothed by the smoothing processing at the timing of the zero-crossing point detected by the zero-crossing detection unit as the carrier offset frequency, and wherein the offset detection unit calculates a sum of the base band signal and the signal obtained by delaying the base band signal by one symbol, and performs smoothing processing on the summed signal.

2. An information communication device including a carrier offset detection circuit according to claim 1.

3. A carrier offset detection circuit which is provided to a demodulation circuit which demodulates a received signal subjected to FSK (Frequency Shift Keying) modulation, and which detects a carrier offset frequency between a transmitting side and a receiving side, comprising:
  a zero-crossing detection unit which receives a base band signal in the form of a digital signal which indicates a level of the frequency deviation of the received signal from the carrier frequency on the receiving side, and detects a zero-crossing point at which the base band signal and a base band signal obtained by delaying the base band signal by one symbol cross each other; and
  an offset detection unit which determines a value of the base band signal at a timing of the zero-crossing point detected by the zero-crossing detection unit as the carrier offset frequency,
  wherein the zero-crossing detection unit includes a ringing removal unit configured such that, in a case in which a difference between the value of the base band signal at the zero-crossing point detected by the zero-crossing detection unit and the value of the base band signal a predetermined period of time before the zero-crossing point is smaller than a predetermined threshold value, the zero-crossing point is masked.

4. A carrier offset detection circuit which is provided to a demodulation circuit which demodulates a received signal subjected to FSK (Frequency Shift Keying) modulation, and which detects a carrier offset frequency between a transmitting side and a receiving side, comprising:
  a zero-crossing detection unit which receives a base band signal in the form of a digital signal which indicates a level of the frequency deviation of the received signal from the carrier frequency on the receiving side, and detects a zero-crossing point at which the base band signal and a base band signal obtained by delaying the base band signal by one symbol cross each other; and
  an offset detection unit which determines a value of the base band signal at a timing of the zero-crossing point detected by the zero-crossing detection unit as the carrier offset frequency,
  wherein the zero-crossing detection unit includes a ringing removal unit configured such that, in a case in which a time interval between the zero-crossing point detected by the zero-crossing detection unit and a previous zero-crossing point is smaller than a predetermined threshold value, the zero-crossing point detected by the zero-crossing detection unit is masked.

5. A carrier offset detection circuit which is provided to a demodulation circuit which demodulates a received signal subjected to FSK (Frequency Shift Keying) modulation, and which detects a carrier offset frequency between a transmitting side and a receiving side, comprising:
  a zero-crossing detection unit which receives a base band signal in the form of a digital signal which indicates a level of the frequency deviation of the received signal from the carrier frequency on the receiving side, and detects a zero-crossing point at which the base band signal and a base band signal obtained by delaying the base band signal by one symbol cross each other; and
  an offset detection unit which determines a value of the base band signal at a timing of the zero-crossing point detected by the zero-crossing detection unit as the carrier offset frequency,
  wherein the zero-crossing detection unit includes a pattern detection unit configured such that, in a case in which there is no zero-crossing point at a timing approximately one symbol period before the zero-crossing point detected by the zero-crossing detection unit, the zero crossing point detected by the zero-crossing detection unit is masked.

6. A Carrier offset detection circuit which is provided to a demodulation circuit which demodulates a received signal subjected to FSK (Frequency Shift Keying) modulation, and which detects a carrier offset frequency between a transmitting side and a receiving side, comprising:
  a zero-crossing detection unit which receives a base band signal in the form of a digital signal which indicates a level of the frequency deviation of the received signal from the carrier frequency on the receiving side, and detects a zero-crossing point at which the base band signal and a base band signal obtained by delaying the base band signal by one symbol cross each other; and
  an offset detection unit which determines a value of the base band signal at a timing of the zero-crossing point detected by the zero-crossing detection unit as the carrier offset frequency,
  wherein the zero-crossing detection unit includes an offset difference limiter circuit which performs sampling processing, at every timing of the zero-crossing point detected the zero-crossing detection unit, on a signal obtained by performing smoothing processing on the base band signal, and is configured such that, in a case in which a difference between a signal sampled at the zero-crossing point and a signal sampled at a previous zero-crossing point is smaller than a predetermined threshold value, the zero-crossing point detected by the zero-crossing detection unit is masked.

7. A carrier offset detection circuit which is provided to a demodulation circuit which demodulates a received signal subjected to FSK (Frequency Shift Keying) modulation, and which detects a carrier offset frequency between a transmitting side and a receiving side, comprising:
  a zero-crossing detection unit which receives a base band signal in the form of a digital signal which indicates a level of the frequency deviation of the received signal from the carrier frequency on the receiving side, and detects a zero-crossing point at which the base band signal and a base band signal obtained by delaying the base band signal by one symbol cross each other; and
  an offset detection unit which determines a value of the base band signal at a timing of the zero-crossing point detected by the zero-crossing detection unit as the carrier offset frequency,
  wherein the offset detection unit receives a detection signal which indicates whether or not the base band signal matches an access code,
  and wherein, in a case in which the base band signal matches the access code, the offset detection unit determines the value of the base band signal at a timing of the zero-crossing point detected by the zero-crossing detection unit as the carrier offset.

8. A carrier offset detection circuit which is provided to a demodulation circuit which demodulates a received signal subjected to FSK (Frequency Shift Keying) modulation, and which detects a carrier offset frequency between a transmitting side and a receiving side, comprising:
  a zero-crossing detection unit which receives a base band signal in the form of a digital signal which indicates a level of the frequency deviation of the received signal from the carrier frequency on the receiving side, and detects a zero-crossing point at which the base band signal and a base band signal obtained by delaying the base band signal by one symbol cross each other; and an offset detection unit which determines a value of the base band signal at a timing of the zero-crossing point detected by the zero-crossing detection unit as the carrier offset frequency, wherein the offset detection unit compares the base band signal with a current carrier offset frequency, detects a cycle at which a magnitude relation between the base band signal and the current carrier offset frequency changes, and corrects the current carrier offset frequency based upon the cycle detected.

9. A carrier offset detection circuit which is provided to a demodulation circuit which demodulates a received signal subjected to FSK (Frequency Shift Keying) modulation, and which detects a carrier offset frequency between a transmitting side and a receiving side, comprising:

a preamble detection unit which receives a base band signal in the form of a digital signal which indicates a level of the frequency deviation of the received signal from the carrier frequency on the receiving side, and detects a preamble from the base band signal; and an offset detection unit which performs smoothing processing on the base band signal, and determines a value of the base band signal smoothed over a period at which the preamble is detected as the carrier offset frequency, wherein the offset detection unit calculates a sum of the base band signal and the signal obtained by delaying the base band signal by one symbol, and performs smoothing processing on the summed signal.

10. A carrier offset detection circuit which is provided to a demodulation circuit which demodulates a received signal subjected to FSK (Frequency Shift Keying) modulation, and which detects a carrier offset frequency between a transmitting side and a receiving side, comprising:

a preamble detection unit which receives a base band signal in the form of a digital signal which indicates a level of the frequency deviation of the received signal from the carrier frequency on the receiving side, and detects a preamble from the base band signal; and an offset detection unit which performs smoothing processing on the base band signal, and determines a value of the base band signal smoothed over a period at which the preamble is detected as the carrier offset frequency, further comprising a zero-crossing detection unit which detects a zero-crossing point of the base band signal and a base band signal obtained by delaying the base band signal by one symbol, which occurs in a period for the preamble, wherein the offset detection unit determines the base band signal smoothed by the smoothing processing at the zero-crossing point as the carrier offset frequency.

11. The carrier offset detection circuit according to claim 10, wherein the zero-crossing detection unit includes a ringing removal unit configured such that, in a case in which a difference between the value of the base band signal at the zero-crossing point detected by the zero-crossing detection unit and the value of the base band signal a predetermined period of time before the zero-crossing point is smaller than a predetermined threshold value, the zero-crossing point is masked.

12. The carrier offset detection circuit according to claim 10, wherein the zero-crossing detection unit includes a ringing removal unit configured such that, in a case in which a time interval between the zero-crossing point by the zero-crossing detection unit detected and a previous zero-crossing point is smaller than a predetermined threshold value, the zero-crossing point detected by the zero-crossing detection unit is masked.

13. The carrier offset detection circuit according to claim 12, wherein the zero-crossing detection unit includes a pattern detection unit configured such that, in a case in which there is no zero-crossing point at a timing approximately one symbol period before the zero-crossing point detected by the zero-crossing detection unit, the zero-crossing point detected by the zero-crossing detection unit is masked.

14. The carrier offset detection circuit according to claim 10, wherein the zero-crossing detection unit includes an offset difference limiter circuit which performs sampling processing, at every timing of the zero-crossing point detected by the zero-crossing detection unit, on a signal obtained by performing smoothing processing on the base band signal, and is configured such that, in a case in which a difference between a signal sampled at the zero-crossing point and a signal sampled at a previous zero-crossing point is smaller than a predetermined threshold value, the zero-crossing point detected by the zero-crossing detection unit is masked.

15. The carrier offset detection circuit according to claim 10, wherein the offset detection unit receives a detection signal which indicates whether or not the base band signal input matches an access code, and wherein, in a case in which the base band signal input matches the access code, the offset detection unit determines the value of the base band signal at a timing of the zero-crossing point detected by the zero-crossing detection unit as the carrier offset frequency.

16. The carrier offset detection circuit according to claim 10, wherein the offset detection unit compares the base band signal with a current carrier offset frequency, detects a cycle at which a magnitude relation between the base band signal and the current carrier offset frequency changes, and corrects the current carrier offset frequency based upon the cycle detected.

* * * * *